United States Patent

[11] 3,608,672

| [72] | Inventor | Gerard W. Dandridge<br>4857 W. 147th St., Hawthorne, Calif. 90250 |
|---|---|---|
| [21] | Appl. No. | 805,445 |
| [22] | Filed | Mar. 10, 1969 |
| [45] | Patented | Sept. 28, 1971 |

[54] AUTOMATIC GEAR LUBRICATOR
4 Claims, 2 Drawing Figs.

[52] U.S. Cl. ..................................... 184/6 TT,
184/7 E
[51] Int. Cl. ..................................... F01m 1/00,
F16n 7/36
[50] Field of Search ........................... 184/6 U, 6
Y, 7, 26, 27, 6 TT, 7 E; 103/3; 230/120 HS;
74/467, 468

[56] References Cited
UNITED STATES PATENTS

| 1,850,340 | 3/1932 | Cowles | 184/6 X |
| 2,359,654 | 10/1944 | Ligh | 74/467 |
| 3,100,027 | 8/1963 | Harris et al. | 184/6 |
| 3,146,629 | 9/1964 | Schmitter | 74/467 X |
| 3,415,138 | 12/1968 | Rumbarger et al. | 74/468 X |
| 3,424,022 | 1/1969 | Greenberg et al. | 74/468 |

*Primary Examiner*—Manuel A. Antonakas
*Attorney*—Lyon & Lyon

ABSTRACT: A device for continuously supplying small quantities of grease to a gear or train of gears. The unit consists of an idler gear to which is coupled a screwshaft mounted in a body which is suitably drilled and channeled and to which is connected a spring-loaded grease cartridge. The screwshaft takes grease supplied from the cartridge and conducts a metered amount through the channels to the idler gear where it is expelled between the gear teeth to lubricate gears with which it is in mesh.

INVENTOR
GERARD W. DANDRIDGE
BY
Lyon & Lyon
ATTORNEYS 3,608,672

AUTOMATIC GEAR LUBRICATOR

BACKGROUND OF THE INVENTION

In machinery employing a number of gears or gear trains, it is necessary to assure that the gears are constantly lubricated to avoid the effects of wet or dusty conditions often found to prevail in such instances. This requires constant attention and in some cases it is necessary to shut the machinery down in order to undertake a comprehensive lubrication and cleaning service. In other instances where severe dust and moisture conditions prevail, it is frequently necessary to operate the gears in an oil bath. While this is satisfactory for lubrication purposes, it adds an additional factor of danger of gear failure should the covers on the oil bath leak and such leakage not be detected in time.

SUMMARY OF THE INVENTION

The device of the present invention seeks to eliminate the problems inherent in previous steps taken to assure adequate lubrication of gears and gear trains. The unit consists of a screwshaft coupled to an idler gear and mounted in a housing. The housing is provided with a grease-conducting channel one end of which is adapted to be connected to a disposable grease cartridge and the other end of the channel couples to a drill passage in the screwshaft which in turn connects with a radial drill passage in the idler gear. The screwshaft drives grease from the grease cartridge through the channel and out the drill passage in the idler gear into the bottom land of the gear so that upon rotation of the idler gear when it is meshed with another gear, grease will be conducted to the other gears of the gear train.

It is an object therefore of the present invention to provide a device for automatically supplying gear lubricant to a gear train.

More specifically, it is an object of the present invention to provide a device which automatically supplies gear lubricant in metered amounts to an operating gear train without necessity for periodic lubrication or stoppage of the machine.

DESCRIPTION OF THE INVENTION

Figure 1:
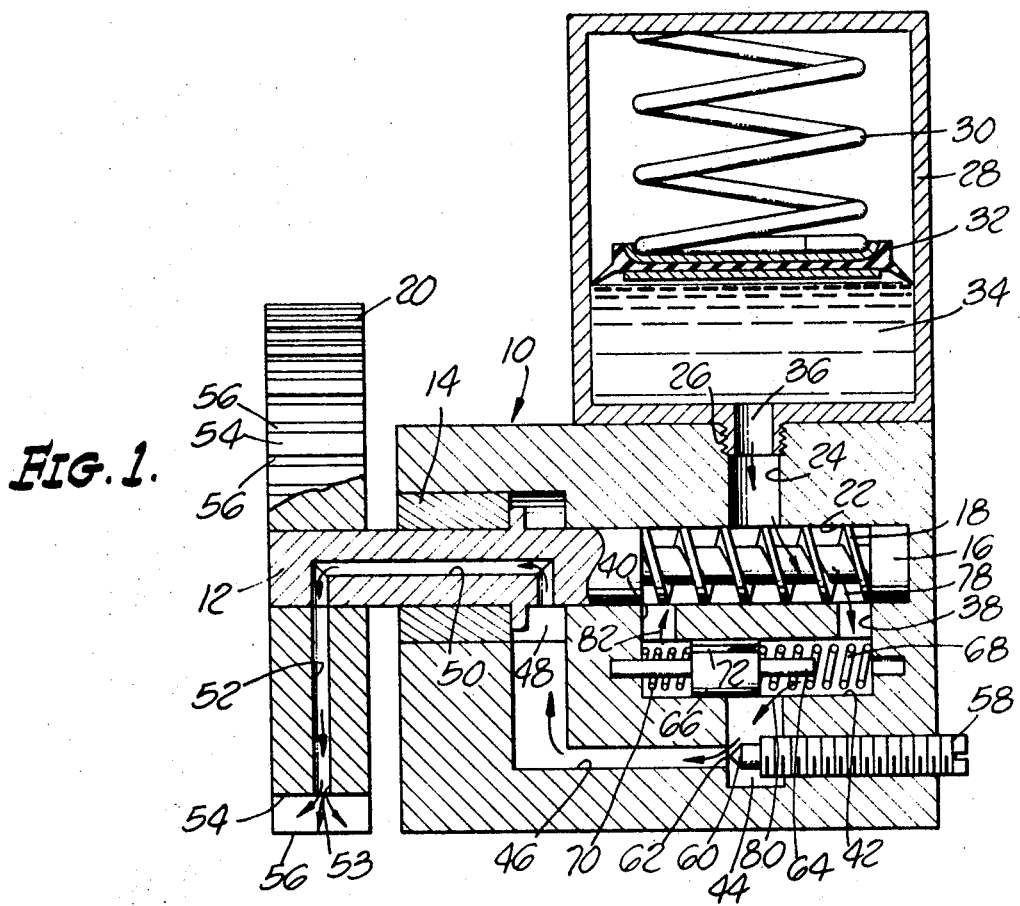
FIG. 1 is a sectional elevation of the automatic gear lubricator made in accordance with the present invention.

In FIG. 1, the unit consists of a housing 10 in which there is mounted a screwshaft 12, which is suitably mounted upon thrust bearing 14 and journal bearing 16. Shaft 12 has a screwshaft portion 18 located at one end thereof positioned inside the housing 10. The other end of shaft 12 is connected to an idler gear 20.

The screwshaft portion 18 of shaft 12 resides in a horizontally extending screw passage 22 in housing 10. A vertically oriented inlet passage 24 communicates with screw passage 22 and is threaded at the upper aperture 26 thereof to receive a grease reservoir 28 therein. Reservoir 28 is adapted to receive a typical disposable grease cartridge of a design well known in the industry including a spring 30 and piston 32 adapted to force the grease 34 downwardly out the lower aperture 26. Aperture 36 will thus be in fluid communication with vertical passage 24.

At each end of the screwshaft passage 22 are vertical passages 38 and 40 which communicate with a horizontal valve chamber 42. Near the center of chamber 42 is another vertically oriented passage 44 in communication therewith which in turn connects to passage 46 which is in turn in communication with collection chamber 48. The end of shaft 12 which is connected to the idler gear 20 is provided with a drill passage 50, one end of which is in open communication with chamber 48. Drill passage 50 in turn communicates with a second drill passage 52 formed in the idler gear 20 which extends from the center of gear 20 radially outward to one of the bottom lands 54 between the gear teeth 56. Passage 52 ends at aperture 53 through which lubricant is conducted into the space between the gear teeth.

A metering screw 58 is mounted in the housing 10 having its inner extremity 60 positioned at the junction between passage 44 and passage 46, where a seat 62 may be provided. Adjustment of the screw 58 controls the amount of grease conducted to the idler gear 20. A horizontal shaft 64 is concentrically mounted in valve chamber 42 and slidable valve element 66 is mounted thereon. Coil springs 68 and 70 are positioned on each side of element 66 and normally position it over the upper opening to passage 44. Element 66 is provided with a bleed passage 72.

Figure 2:
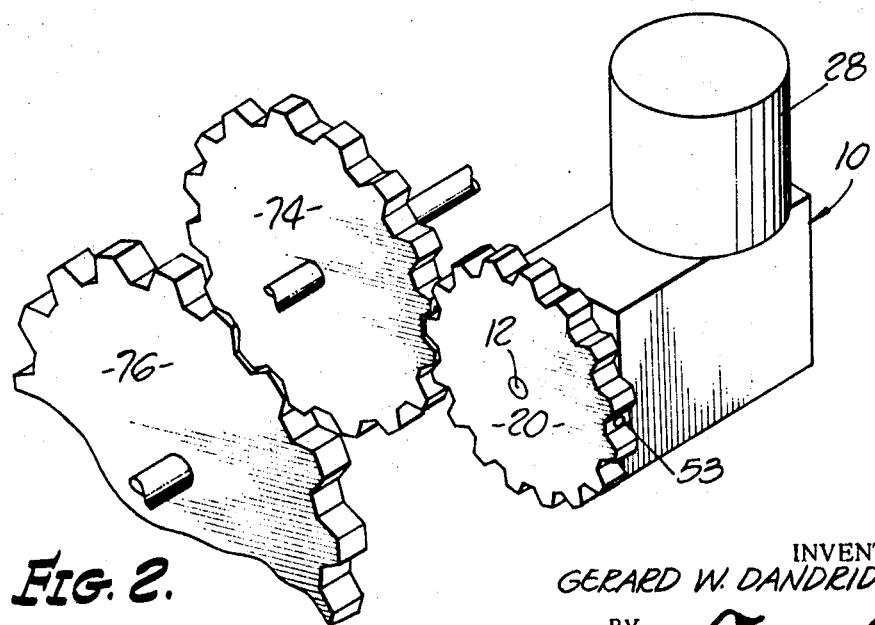
FIG. 2 is a perspective pictorial illustration showing a typical installation of the automatic gear lubricator in a gear train.

As shown in FIG. 2, the unit may be mounted in any typical gear train or in conjunction with any gear which requires lubrication. The unit is merely mounted so that idler gear 20 meshes with any one of the gears in the gear train. The turning of the gear will in turn cause rotation of idler gear 20 and grease coming through aperture 53 will be spread to the other gears such as gear 74 which will in turn, in time conduct grease to the other gears such as gear 76. Not only does the rotation of gear 20 spread the grease to the other gears but it is the rotation of that gear which also conducts grease from the grease reservoir 28 and expels it from aperture 53. This will be apparent from an examination of FIG. 1.

As idler gear 20 turns, it rotates the screwshaft 18 which causes positive displacement of grease 34 which is under pressure in passage 24 and expels it in the direction of arrow 78 into the valve chamber 42. Pressure on the right-hand side of element 66 forces it off of the opening to passage 44 which will permit the grease to flow in the direction of arrow 80. Depending upon the position of metering screw 58, some of the grease so expelled will then travel through passage 46 to the collection chamber 48. When the chamber 48 is filled with grease, it will be forced into drill passage 50 thence to drill passage 52 where it will be expelled from aperture 53. Since, in constant operation, it is only necessary to provide a small amount of grease, it may be desirable to close adjusting screw 58 so that only a small amount is added in the collector 48. The amount of grease expelled by the screwshaft 18 is, however, constant and the amount not expelled into passage 46 will be conducted through bleed passage 72 back in the direction of arrow 82 into the screw passage 22 where it will be in turn reconducted back into the right-hand side of chamber 42 for further use. In instances where only a small amount of grease is being metered to the idler gear, it may be possible that screw passage 22 will sometimes be substantially full of grease in which case only small additional amounts will be extracted from the reservoir.

It will be obvious that the present invention provides a most versatile device inasmuch as the provision of the slidable valve 66 permits use of the gear lubricator no matter which direction of rotation is imparted to idler gear 20. This permits the most versatile mounting of the lubricator so that it is not necessary to find a location in which the idler gear 20 will be driven in a desired direction of rotation. This will be seen from the fact that rotation of the idler gear 20 in a direction opposite to that previously described will conduct the grease in a direction opposite to that of arrow 82 forcing the valve element 66 to the right in FIG. 1 and reconducting unused grease back through the screw shaft passage.

While a particular embodiment of the present invention has been shown and described, it will be obvious to persons skilled in the art that changes and modifications may be made without departing from this invention in its broader aspects. For example, while one drill passage 52 in the idler gear has been shown, it may be necessary or desirable to provide more than one such passage, perhaps of small diameter to more uniformly distribute lubricant to the desired gears. In addition, the orientation and position of the various grease-conducting passages may be varied and so might the position of the adjusting screw. It is the aim of the appended claims to cover these and all other such changes and modifications, including equivalents, as fall within the true scope and spirit of this invention.

I claim:
1. An automatic gear lubricator comprising:
a body having a lubricant-conducting channel formed therein, a lubricant reservoir, one end of said channel connected to said reservoir;
an idler gear mounted on said body, said idler gear having a lubricant-conducting passage, said passage having one end terminating at an aperture in a bottom land of said gear, said passage having the other end connected to the other end of said channel;
lubricant-conducting means comprising a shaft mounted in said body, said shaft being coupled to said idler gear, said shaft having a screwshaft portion, said screwshaft portion being situated in said channel whereby rotation of said idler gear rotates said screwshaft to drive lubricant through said channel; and
valve means in said channel, said valve means having first and second positions, said positions selectively permitting flow of lubricant in said channel for clockwise and counterclockwise rotation of said screwshaft.
2. A gear-lubricating mechanism of the type described in claim 1 further including metering means mounted in said channel for controlling the rate of flow of lubricant therein, said metering means comprising variable screw means in said channel and a bleed passage in said valve means.
3. An automatic gear lubricator, comprising:
a housing having a lubricant-conducting channel;
a lubricant reservoir mounted upon said body, said channel having one end coupled to said reservoir;
a screw passage situated intermediate the ends of said channel, screw means rotatably mounted in said passage, said screw means mounted upon a screwshaft, said screw passage having front and rear outlet passages;
a valve chamber situated intermediate the ends of said channel, said outlet passages connected to said valve chamber, said valve chamber having an outlet aperture connected to said channel, a valve element in said chamber, resilient means normally positioning said valve element over said outlet aperture, said valve element being movable to permit emission of lubricant from said chamber for either direction of rotation of said screw;
an idler gear mounted upon said screwshaft, said gear having a lubricant-conducting passage, said passage being coupled to said channel, said passage having an outlet aperture in a bottom land of said gear.
4. A gear lubricating mechanism of the type described in claim 3 further including metering means mounted in said channel for controlling the rate of flow of lubricant therein, said metering means comprising variable screw means in said channel and a bleed passage in said valve means.